US010254780B2

United States Patent
Lee et al.

(10) Patent No.: US 10,254,780 B2
(45) Date of Patent: Apr. 9, 2019

(54) METHOD AND APPARATUS FOR DISTRIBUTING POWER IN ENERGY STORAGE SYSTEM

(71) Applicant: HYOSUNG HEAVY INDUSTRIES CORPORATION, Seoul (KR)

(72) Inventors: Jin Ho Lee, Ansan-si (KR); Bo Gun Jin, Anyang-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 250 days.

(21) Appl. No.: 15/108,581

(22) PCT Filed: Dec. 30, 2014

(86) PCT No.: PCT/KR2014/013083
§ 371 (c)(1),
(2) Date: Jun. 28, 2016

(87) PCT Pub. No.: WO2015/102396
PCT Pub. Date: Jul. 9, 2015

(65) Prior Publication Data
US 2016/0334821 A1   Nov. 17, 2016

(30) Foreign Application Priority Data
Dec. 30, 2013  (KR) .................. 10-2013-0167734

(51) Int. Cl.
*G05F 1/66* (2006.01)
*H02J 3/32* (2006.01)
*H02J 3/38* (2006.01)

(52) U.S. Cl.
CPC .................. *G05F 1/66* (2013.01); *H02J 3/32* (2013.01); *H02J 3/383* (2013.01); *H02J 3/386* (2013.01); *G05B 2219/49092* (2013.01)

(58) Field of Classification Search
CPC ..... G05F 1/66; H02J 3/32; H02J 3/383; H02J 3/386
See application file for complete search history.

(56) References Cited

U.S. PATENT DOCUMENTS

2009/0327186 A1* 12/2009  Vivalda .................. G06Q 10/06
                                                        706/46
2012/0146421 A1*  6/2012  Umayahara ....... H01M 8/04365
                                                        307/80

(Continued)

FOREIGN PATENT DOCUMENTS

JP      2011-221012 A    11/2011
JP      2013-149609 A     8/2013
(Continued)

OTHER PUBLICATIONS

International Search Report in International Application No. PCT/KR2014/013083, dated Apr. 3, 2015.

*Primary Examiner* — Robert E Fennema
*Assistant Examiner* — Santosh R Poudel
(74) *Attorney, Agent, or Firm* — Novick, Kim & Lee, PLLC; Jae Youn Kim

(57) ABSTRACT

Disclosed is an method and apparatus for electric power distribution in an energy storage system. The electric power distribution method of the energy storage system (ESS) includes computing a total power amount on the basis of a received user output target power amount and a deviation amount, determining a power distribution power conditioning system (PCS) to which the total power amount is distributed out of the PCSs included in the ESS, and distributing the total power amount on the basis of the power distribution PCS. The deviation amount is a difference between an existing user output target power amount used in an existing power distribution process and an existing total power amount.

4 Claims, 9 Drawing Sheets

(56) References Cited

U.S. PATENT DOCUMENTS

| | | | | |
|---|---|---|---|---|
| 2012/0285774 A1* | 11/2012 | Harkonen | ............... | B66B 1/302 |
| | | | | 187/289 |
| 2013/0285610 A1* | 10/2013 | Katou | ................... | H01M 10/42 |
| | | | | 320/125 |
| 2014/0197686 A1* | 7/2014 | Hiramura | .............. | H02J 7/0013 |
| | | | | 307/29 |
| 2015/0137739 A1* | 5/2015 | Shizuno | .............. | H01M 10/441 |
| | | | | 320/107 |
| 2015/0171666 A1* | 6/2015 | Yeon | ....................... | H02J 9/061 |
| | | | | 700/297 |
| 2016/0064970 A1* | 3/2016 | Shimizu | .................. | H02J 3/386 |
| | | | | 320/134 |
| 2016/0274607 A1* | 9/2016 | Kudo | ......................... | H02J 3/32 |
| 2017/0256945 A1* | 9/2017 | Hanada | ................... | H02J 7/042 |

FOREIGN PATENT DOCUMENTS

| | | |
|---|---|---|
| KR | 10-2013-0024763 A | 3/2013 |
| KR | 10-1337576 B1 | 12/2013 |

* cited by examiner

FIG. 6

▲Rt STATUS

| | PCS1 | PCS2 | PCS3 | ... | PCSN |
|---|---|---|---|---|---|
| CAPA | C1 | C2 | C3 | ... | CN |
| SOC | S1 | S2 | S3 | ... | SN |
| $\eta$ | E1 | E2 | E3 | ... | EN |

(a)

▲CRITERIA

| MATRIX A | CAPA | SOC | $\eta$ |
|---|---|---|---|
| CAPA | 1 | 5 | 9 |
| SOC | 1/5 | 1 | 5 |
| $\eta$ | 1/9 | 1/5 | 1 |

⇨

| A = A^2 | CAPA | SOC | $\eta$ |
|---|---|---|---|
| CAPA | 3.0000 | 11.8000 | 43.0000 |
| SOC | 0.9556 | 3.0000 | 11.8000 |
| $\eta$ | 0.2622 | 0.9556 | 3.0000 |

⇨

| EIGEN VECTOR |
|---|
| $\omega_{cr,1} = \dfrac{\sum_j a_{1j}}{\sum_{i,j} a_{ij}}$ |
| $\omega_{cr,2} = \dfrac{\sum_j a_{2j}}{\sum_{i,j} a_{ij}}$ |
| $\omega_{cr,3} = \dfrac{\sum_j a_{3j}}{\sum_{i,j} a_{ij}}$ |

⇨

| EIGEN VECTOR |
|---|
| 0.7432 |
| 0.2026 |
| 0.0542 |

⇨ WEIGHT OF CRITERION

※ WHERE $\omega_k = \dfrac{\sum_j a_{kj}}{\sum_{i,j} a_{ij}}$ AND $\sum_k \omega_k = 1$ (b)

FIG. 7

▲ALTERNATIVES CAPA

| | PCS1 | PCS2 | PCS3 | ... | PCSN |
|---|---|---|---|---|---|
| PCS1 | 1 | $\frac{PCS1\ CAPA}{PCS2\ CAPA}$ | $\frac{PCS1\ CAPA}{PCS3\ CAPA}$ | ... | $\frac{PCS1\ CAPA}{PCSN\ CAPA}$ |
| PCS2 | | 1 | $\frac{PCS2\ CAPA}{PCS3\ CAPA}$ | ... | $\frac{PCS2\ CAPA}{PCSN\ CAPA}$ |
| PCS3 | | | 1 | ... | $\frac{PCS3\ CAPA}{PCSN\ CAPA}$ |
| ... | | | | 1 | ... |
| PCSN | $\frac{PCSN\ CAPA}{PCS1\ CAPA}$ | $\frac{PCSN\ CAPA}{PCS2\ CAPA}$ | $\frac{PCSN\ CAPA}{PCS3\ CAPA}$ | ... | 1 |

⇑

| EIGEN VECTOR |
|---|
| $\omega_{c,1} = \frac{\sum_j a_{1j}}{\sum_{i,j} a_{ij}}$ |
| $\omega_{c,2} = \frac{\sum_j a_{2j}}{\sum_{i,j} a_{ij}}$ |
| $\omega_{c,3} = \frac{\sum_j a_{3j}}{\sum_{i,j} a_{ij}}$ |
| ... |
| $\omega_{c,N} = \frac{\sum_j a_{Nj}}{\sum_{i,j} a_{ij}}$ |

SOC, η

| | PCS1 | PCS2 | PCS3 | ... | PCSN |
|---|---|---|---|---|---|
| PCS1 | | | | | |
| PCS2 | | MAKE RELATIVE COMPARISON MATRIX AS DESCRIBED ABOVE | | | |
| PCS3 | | | | | |
| ... | | | | | |
| PCSN | | | | | |

⇑

| EIGEN VECTOR |
|---|
| $\omega_{s,1} = \frac{\sum_j a_{1j}}{\sum_{i,j} a_{ij}}$ |
| $\omega_{s,2} = \frac{\sum_j a_{2j}}{\sum_{i,j} a_{ij}}$ |
| $\omega_{s,3} = \frac{\sum_j a_{3j}}{\sum_{i,j} a_{ij}}$ |
| ... |
| $\omega_{s,N} = \frac{\sum_j a_{Nj}}{\sum_{i,j} a_{ij}}$ |

| EIGEN VECTOR |
|---|
| $\omega_{e,1} = \frac{\sum_j a_{1j}}{\sum_{i,j} a_{ij}}$ |
| $\omega_{e,2} = \frac{\sum_j a_{2j}}{\sum_{i,j} a_{ij}}$ |
| $\omega_{e,3} = \frac{\sum_j a_{3j}}{\sum_{i,j} a_{ij}}$ |
| ... |
| $\omega_{e,N} = \frac{\sum_j a_{Nj}}{\sum_{i,j} a_{ij}}$ |

METHOD AND APPARATUS FOR DISTRIBUTING POWER IN ENERGY STORAGE SYSTEM

CROSS-REFERENCE TO RELATED APPLICATIONS

This application is the National Stage filing under 35 U.S.C. 371 of International Application No. PCT/KR2014/013083, filed on Dec. 30, 2014, which claims the benefit of Korean Patent Application No. 10-2013-0167734, filed on Dec. 30, 2013, the contents of which are all hereby incorporated by reference herein in their entirety.

TECHNICAL FIELD

The present invention relates to an electric power distribution method, and more particularly, to a method and apparatus for distributing electric power in an energy storage system.

BACKGROUND ART

The energy storage system refers to a system capable of storing extra electric power in a power system (grid) and using it at a necessary time point to efficiently use energy. In general, extra electric power is stored during a low load period such as nighttime, and the stored electric power is released during a heavy load period such as daytime. Therefore, electric power quality can be optimized through load leveling and the frequency control. It is anticipated that the ESS takes an important role in conversion of recently highlighted renewable energy sources into high quality electric power and interconnection of the converted electric power to a grid. In particular, the ESS is indispensable when a solar photovoltaic system or a wind turbine suffering from a serious output fluctuation is interconnected to the electrical grid.

The energy storage principle is simple. That is, electric energy received from a power system is ionized or converted into kinetic energy. The kinetic energy is stored as physically compressed and chemical energy. Then, the stored energy is converted and supplied to the power grid at a necessary timing. Various types of middle/large-sized energy storage systems are known in the art. For example, a lithium ion battery as a representative secondary battery has a separation membrane and electrolyte interposed between positive and negative electrodes, through which lithium ions are exchanged to store or discharge energy. It is known that the lithium ion battery exhibits excellent output characteristics and efficiency, but is still expensive. A sodium sulfur battery is operated by activating solid electrolyte capable of conducting sodium ions at a high temperature and is advantageously employed in a large capacity ESS. A redox flow battery is a type of rechargeable battery where energy is stored using an electrochemical reduction/oxidation potential and is suitable for long-time use in a large capacity. A supercapacitor having a fast response characteristic is employed in automotive regenerative braking systems and a short-term energy storage of a regenerative energy system for attenuating an output fluctuation. In addition, a flywheel and a compressed air storage device as a mechanical storage system are also highlighted as a mechanical energy storage ESS.

SUMMARY OF INVENTION

The present invention provides an electric power distribution method in an energy storage system.

In addition, the present invention provides an energy storage system capable of efficiently distributing electric power.

According to a first aspect of the invention, there is provided an electric power distribution method in an energy storage system (ESS), including steps of: computing a total power amount on the basis of a received user output target power amount and a deviation amount; determining a power distribution PCS to which the total power amount is distributed out of the power conditioning systems (PCSs) included in the ESS; distributing the total power amount on the basis of a weight for the power distribution PCS, wherein the deviation amount refers to a difference between an existing total power amount and an existing user output target power amount used in an existing power distribution process. In the electric power distribution method described above, the power distribution PCS may be determined by detecting a state of charge (SoC) of the PCS. The weight for the power distribution PCS may be determined on the basis of first and second weighting factors, the first weighting factor may be a relative weight for each weight decision element, and the second weighting factor may be a weight for each weight decision element computed for each power distribution PCS. The weight decision element may include a charge capacity, a state of charge, and discharge efficiency. The electric power distribution method may further include a step of storing the user output target power amount and the deviation amount.

According to a second aspect of the invention, there is provided an electric power distribution apparatus that performs power distribution, the electric power distribution apparatus comprising a processor, the processor being implemented to compute a total power amount on the basis of a received user output target power amount and a deviation amount, determine a power distribution PCS, to which the total power amount is distributed, out of power conditioning systems (PCS) included in an energy storage system (ESS), and distribute the total power amount on the basis of a weight for the power distribution PCS, wherein the deviation amount is a difference between an existing total power amount and an existing user output target power amount used in an existing power distribution process. In the electric power distribution apparatus described above, the power distribution PCS may be determined by detecting a state of charge (SoC) of the PCS. The weight for the power distribution PCS may be determined on the basis of first and second weighting factors, the first weighting factor may be a relative weight for each weight decision element, and the second weighting factor may be a weight for each weight decision element computed for each power distribution PCS. The weight decision element may include a charge capacity, a state of charge, and discharge efficiency. The processor may be implemented to store the user output target power amount and the deviation amount.

As described above, using the method and apparatus for electric power distribution are in the energy storage system according to the present invention, it is possible to maintain the uniform SoC in the "N" batteries and improve battery use efficiency as a whole. As a result, it is possible to use efficiency of the entire ESS from a user's viewpoint.

BRIEF DESCRIPTION OF DRAWINGS

FIG. 6 is a conceptual diagram illustrating a weight computation method according to an embodiment of the invention;

FIG. 7 is a conceptual diagram illustrating a weight computation method according to an embodiment of the invention;

DESCRIPTION OF EMBODIMENTS

Figure 1:
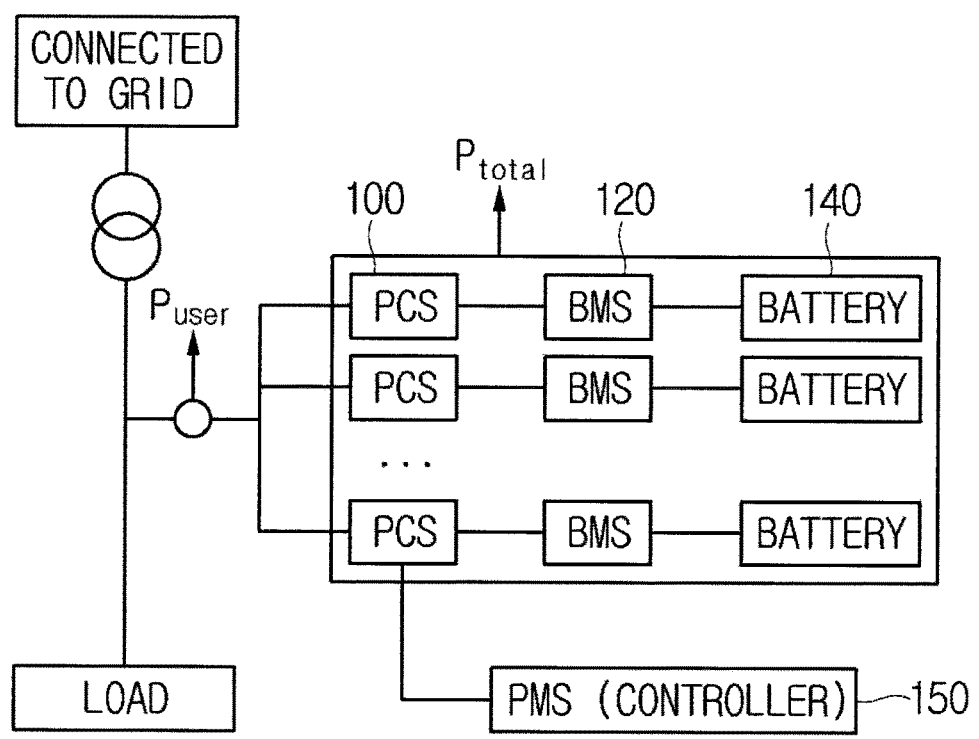
FIG. 1 is a conceptual diagram schematically illustrating an energy storage system (ESS) according to an embodiment of the invention.

Various example embodiments will be described more fully hereinafter with reference to the accompanying drawings, in which some example embodiments are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that, although the terminologies "first," "second," "third," etc. may be used herein to describe various elements, these elements should not be limited by these terminologies. These terminologies are only used to distinguish one element from another. Thus, a first element could be termed a second element, and a second element could be termed a first element either without departing from the teachings of the present invention. As used herein, the terminology "and/or" includes any and all combinations of one or more of the associated listed items.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Preferred embodiments of the present invention will now be described in more detail with reference to the accompanying drawings. Hereinafter, like reference numerals denote like elements throughout the drawings, and they will not be described repeatedly.

In an energy storage system (ESS) according to an embodiment of the invention, real-time output distribution computation for "N" power conditioning systems (PCSs) connected in parallel (where "N" denotes any natural number) is performed by a power management system (PMS) instead of a master PCS. In this case, output distribution computation is facilitated when a new power conditioning system (PCS) is added, an existing PCS is removed, or a trip occurs in an (m)th PCS (where "m" denotes any natural number).

Using the output distribution method according to an embodiment of the invention, it is possible to maintain a uniform state of charge (SOC) in the "N" batteries, improve battery use efficiency as a whole, and thus improve use efficiency of the entire ESS from a user's viewpoint.

FIG. 1 is a conceptual diagram schematically illustrating an ESS according to an embodiment of the invention.

Referring to FIG. 1, the ESS may include a plurality of PCSs 100 connected in parallel, a plurality of battery management systems (BMSs) 120 connected to the PCSs 100, and a plurality of batteries 140 connected to the BMSs 120. In addition, each PCS 100 may be controlled by the PMS 150.

The PCS 100 may be implemented to supply electric power to a load that uses commercial power. In addition to the commercial power, electric power may be generated from renewable energy such as sunlight or wind. If the power generated from a renewable-energy-based power generator such as a solar power generator or a wind turbine is significant, energy may be stored (charged) in a lithium-polymer (lithium ion) battery through a bidirectional power conditioning system.

According to an embodiment of the invention, instead of the PCSs 100, the PMS 150 may be implemented to perform real-time output distribution computation of the PCSs 100 connected in parallel so that the output distribution computation can be performed when a new PCS 100 is added, an existing PCS 100 is removed, or a trip occurs in the (m)th PCS 100, and the like. Such an output distribution computation method will be described below. The output distribution method using the PMS 150 makes it possible to maintain a uniform SoC in the "N" batteries. Therefore, it is possible to improve battery use efficiency as a whole and thus improve use efficiency of the entire ESS from a user's viewpoint.

The PMS 150 may be implemented to transmit information necessary in energy charge/discharge control to the PCSs 100 through communication with the PCSs 100. The PMS 150 may receive various types of information regarding an energy state in the PCSs 100 and BMSs 120 or a battery state such as voltages, currents, and temperatures of battery cells and determine a protection functionality for overvoltage, overcurrent, or overtemperature to protect the battery cells from an abnormal state. In addition, the PMS 150 may transmit a battery module charge/discharge ON/OFF signal to the PCSs 100 to instruct a charge/discharge operation of the battery module.

In a conceptual meaning, the battery module may include the BMS 120 and the battery 140. The battery module is a lithium-polymer (lithium ion) battery having high performance, a long operation life, and excellent instantaneous charge/discharge performance. Development of the lithium-polymer battery makes it possible to improve instantaneous charge/discharge performance of the battery and increase a battery capacity and promotes remarkable development of the energy storage system.

The BMS 120 may be embedded in the battery module. The BMS 120 may obtain basic data for checking a state of the battery 140 and control the operation of the battery. In order to guarantee safety of the battery 140, a state of the battery 140 such as voltage, current, and temperature may be detected and transmitted to an upper layer device through communication. Such functionalities and information are necessary to safely operate the energy storage system. The upper layer device such as the PCS 100 or the PMS 150 checks a battery operation state or detects an error on the basis of this information. As a result, the battery module can be protected from an abnormal state using a protection circuit capable of preventing overvoltage, overcurrent, over-temperature, and the like.

Figure 2:
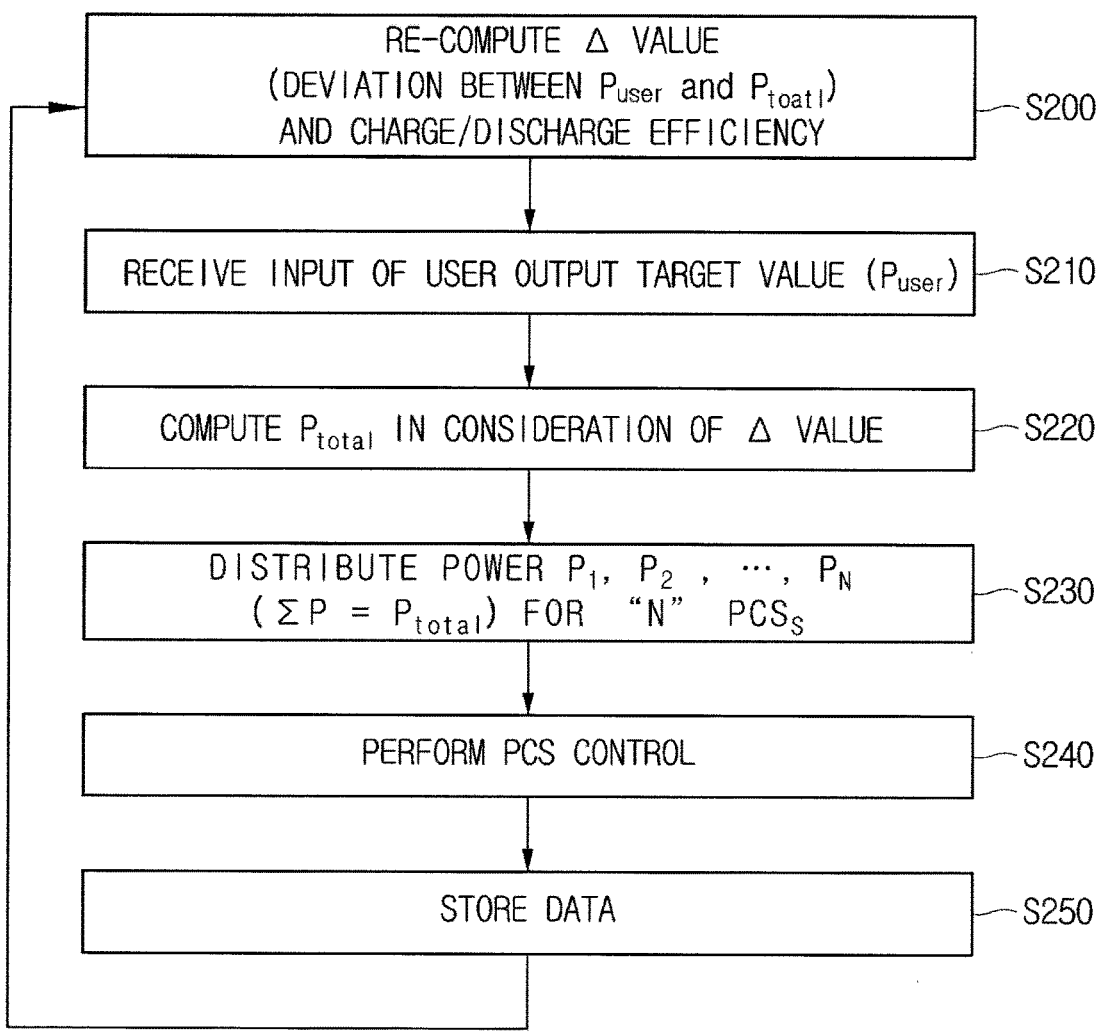
FIG. 2 is a flowchart illustrating a power distribution operation according to an embodiment of the invention.

FIG. 2 is a flowchart illustrating a power distribution operation according to an embodiment of the invention.

Referring to FIG. 2, the PMS 150 computes a difference between a first user output target power amount and a charged power amount, charge efficiency, and discharge efficiency on the basis of the first user output target power amount and the charged power amount in the existing data (step S200).

The difference between the first user output target power amount and the charged power amount, the charge efficiency, and the discharge efficiency may be computed on the basis of the existing data. The computed information may be used by the PMS 150 as information for performing electric power distribution to each PCS 100.

An input of the second user output target power amount is received (step S210).

The second user output target power amount may be information regarding the power amount input for electric power distribution to the PCSs 100.

A total power amount is computed on the basis of the difference between the first user output target power amount and the charged power amount and the second user output target power amount (step S220).

The total power amount may be computed on the basis of a deviation amount (difference between the first user output target power amount and the charged power amount). The deviation value may be a value computed by comparing the electric power output from the existing ESS and the energy stored in the ESS in practice. The power amount distributed to each PCS 100 of the ESS may be computed in consideration of both the deviation value and the second user output target power amount. The total power amount may be a power amount stored in all of the PCSs in practice.

The total power amount is distributed to each PCS 100 (step S230).

The power amount computed in step S220 may be distributed to each PCS 100. In the distribution to each PCS 100, a weight may be given to each PCS 100 to distribute a different power amount. This will be described in more tail below.

Then, the control for the PCSs 100 is performed (step S240).

The control may be performed to distribute a determined power amount to each PCS 100.

The measurement values of the second user output target power amount and the total power amount are stored (step S250).

Since the measurement values of the second user output target power amount and the total power amount are stored, they may be used as information for distributing electric power to each PCS 100 when a user output target power amount is newly input later.

An electric power distribution method according to an embodiment of the invention will now be described in more detail.

Figure 3:
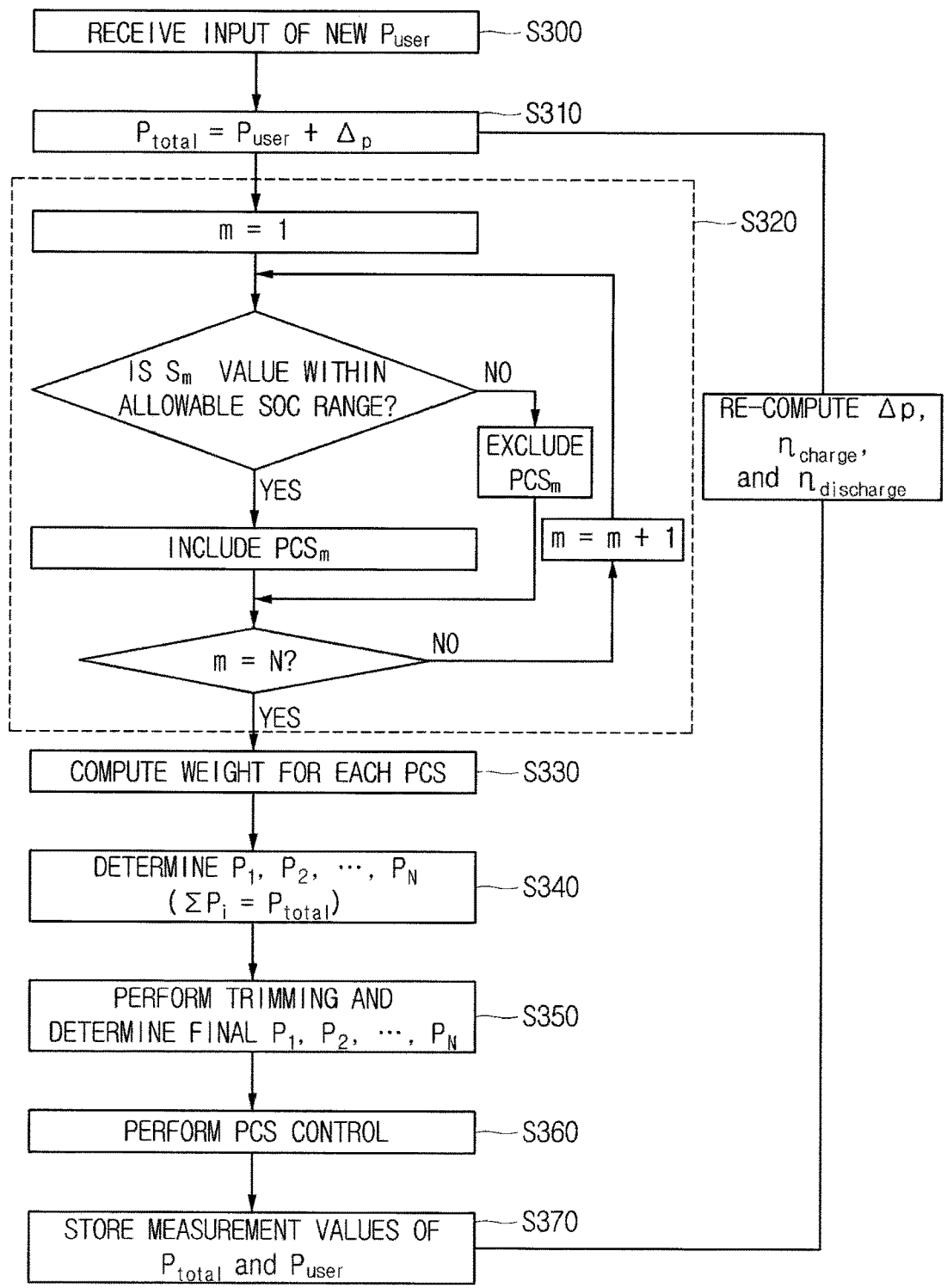
FIG. 3 is a conceptual diagram illustrating an electric power distribution method according to an embodiment of the invention.

FIG. 3 is a conceptual diagram illustrating an electric power distribution method according to an embodiment of the invention.

Referring to FIG. 3, an input of a new user output target power amount is received (step S300).

Information on the new user output target power amount may be received for distribution of electric power to each PCS.

A total power amount is computed on the basis of the new user output target power amount and a deviation amount (step S310).

The deviation amount may be computed on the basis of a difference between the existing user output target power amount and the total power amount stored in the ESS. A current total power amount of the ESS may be computed in consideration of the deviation amount as information regarding the difference between the existing total power amount and the existing user output target power amount and the new user output target power amount.

A PCS 100 as a power distribution target may be determined by detecting the SoCs of the PCSs included in the ESS (step S320).

The SoC may be detected for each PCS 100, and the charging may be performed only for the PCS having a predetermined chargeable state. For example, electric power may not be distributed to the PCS 100 having a predetermined SoC range (for example, 90 to 100%). In this case, such a PCS 100 may be excluded from a power distribution target PCS group.

A weight for power distribution may be computed for each PCS 100 (step S330).

According to an embodiment of the invention, the weight may be computed for each PCS 100 in consideration of the current SoC of the PCS 100, charge efficiency, and discharge efficiency, and the power distribution may be performed on a weight basis. A method of computing the weights for power distribution for each PCS 100 will be described below in more detail.

Electric power to be distributed to each PCS 100 is determined on a weight basis (step S340).

The electric power to be distributed to each PCS 100 may be determined on a weight basis. A total sum of the electric power to be distributed to each PCS 100 may be equal to a total electric power.

Trimming is performed, and final PCS distribution power is determined (step S350).

Control for the PCSs 100 is performed (step S360).

The determined final PCS distribution power may be controlled. As described above, according to this embodiment, in order to control the electric power to be distributed to the PCSs 100, the PMS 150 may be implemented such that real-time output distribution computation for the PCSs 100 connected in parallel is performed not by the PCSs but by the PMS 150. Therefore, the output distribution computation can be performed when a new PCS is added, an existing PCS is removed, or a trip occurs in an (m)th PCT, and the like.

Information on the total electric power and the new user output target power amount is stored (step S370).

The stored information on the total electric power and the new user output target power amount may be used to compute the deviation amount, the charge efficiency, and the discharge efficiency later. The computed values of the deviation amount, the charge efficiency, the discharge efficiency may be used to perform power distribution to the PCSs 100 later.

A method of determining the weight used to perform power distribution to each PCS 100 according to an embodiment of the invention will now be described.

Figure 4:
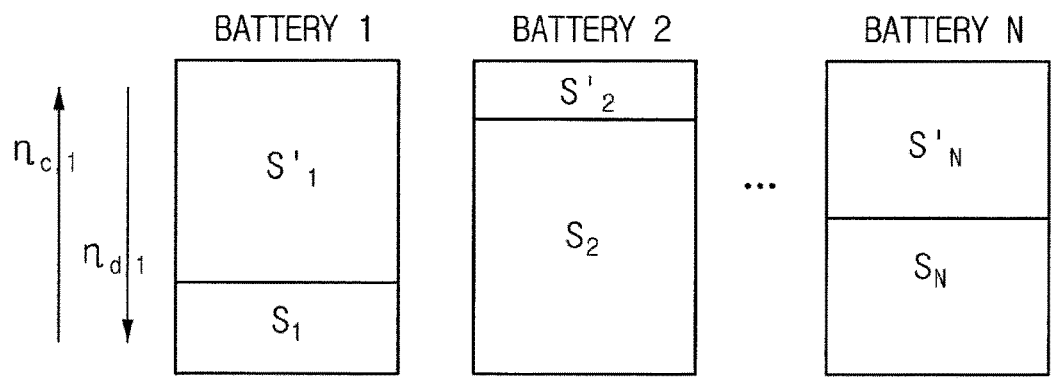
FIG. 4 is a conceptual diagram illustrating a weight computation method according to an embodiment of the invention.

FIG. 4 is a conceptual diagram illustrating a weight computation method according to an embodiment of the invention.

FIG. 4 shows elements relating to a battery state of each PCS 100.

Referring to FIG. 4, a charge capacity 400 of each PCS, a current SoC 410, a 1-SoC 420, charge efficiency 430, and discharge efficiency 440 are defined. These elements may be referred to as a terminology "weight decision elements."

According to an embodiment of the invention, the weight for charging each PCS may be computed on the basis of the weight decision elements for each PCS. Various methods may be employed to compute the weight. According to an embodiment of the invention, an analytic hierarchy process (AHP) is employed to compute the weights.

Figure 5:
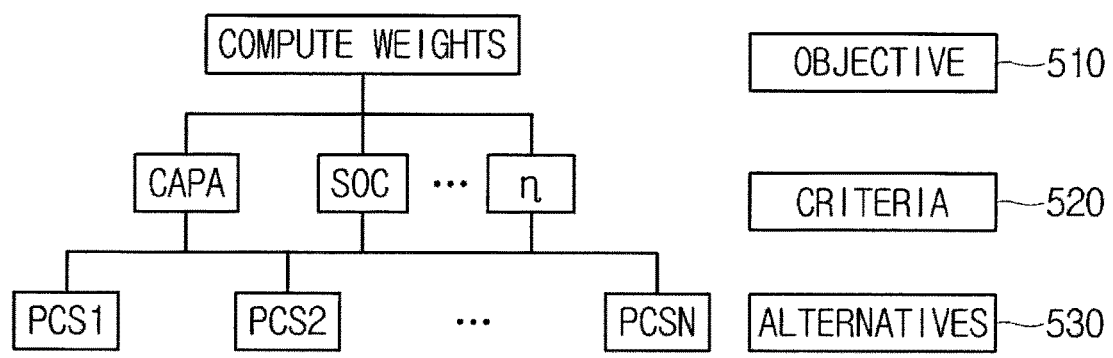
FIG. 5 is a conceptual diagram illustrating a weight computation method according to an embodiment of the invention.

FIG. 5 is a conceptual diagram illustrating a weight computation method according to an embodiment of the invention.

In FIG. 5, an AHP-based weight decision method for computing the electric power to be distributed to the PCSs is illustrated.

In the AHP, a decision problem is decomposed into a hierarchy of criteria, each criterion and their elements are analyzed, and the elements are evaluated by comparing them to each other pairwise, so that priority (or weight) is computed. The AHP-based decision-making process may include four steps, specifically, (1) set a decision problem hierarchy model, (2) collect evaluation data by comparing decision-making elements to each other pairwise, (3) estimate relative weights of the decision-making elements using an eigenvector method, and (4) synthesize the weights in order to rank various alternatives to be evaluated.

FIG. 5 illustrates a decision problem hierarchy model for the decision-making elements in order to determine weights.

Referring to FIG. 5, the weights are set in a first layer 510, the weight decision elements (such as capacity, SoC, and .eta.) are set in a second layer 520, and each PCS of the ESS is set in a third layer 530 (where, ".eta." denotes charge/discharge efficiency).

FIG. 6 is a conceptual diagram illustrating a weight computation method according to an embodiment of the invention.

Referring to FIG. 6, a series of pairwise comparisons are performed on the hierarchy model to collect evaluation data.

Specifically, a series of pairwise comparisons are performed for the weight decision elements such as the charge capacity, the SoC, and the discharge efficiency for each PCS.

Then, relative weights of the decision-making elements are estimated using an eigenvector method.

Specifically, in order to determine the weights, relative weights for each weight decision element are computed on the basis of priorities of each weight decision element. For example, the charge capacity may have a priority higher five times than that of the SoC and nine times than that of the discharge efficiency. In addition, the SoC may have a priority higher five times than that of the discharge efficiency. The eigenvectors may be computed on the basis of the priorities. The computed eigenvectors may be used as the relative weights for each weight decision element.

That is, the relative weights for each weight decision element can be determined using the method of FIG. 6.

This pairwise comparison and estimation of the relative weights for the decision-making elements may be performed for each PCS 100 included in the third layer.

FIG. 7 is a conceptual diagram illustrating a weight computation method according to an embodiment of the invention.

In FIG. 7, a weight of a particular PCS 100 is computed for each weight decision element.

Referring to FIG. 7, the weights may be determined for each PCS 100 on the basis of the weight decision elements such as a charge capacity, a SoC, and discharge efficiency.

The weights computed for each PCS may be used to compute electric power distributed to the PCSs later.

Figure 8:
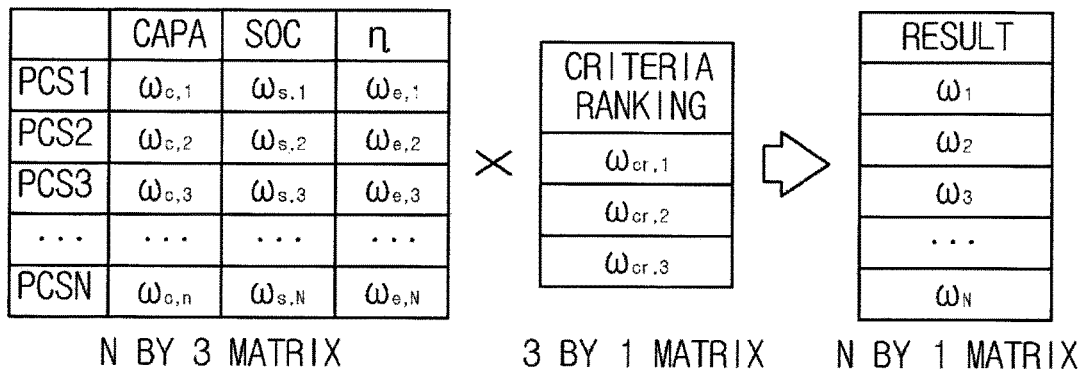
FIG. 8 is a conceptual diagram illustrating a weight synthesizing method according to an embodiment of the invention.

FIG. 8 is a conceptual diagram illustrating a weight synthesizing method according to an embodiment of the invention.

In FIG. 8, decision on final weights for each PCS 100 is performed to determine the electric power distributed to the PCSs 100.

Referring to FIG. 8, final weights for each PCS 100 are decided on the basis of the weights for each weight decision element computed for each PCS 100 using the aforementioned method of FIG. 7 and the relative weights for each weight decision element computed using the aforementioned method of FIG. 5.

The final weights for each PCS 100 may be multiplied by the total power to determine the electric power supplied to each PCS.

If the number of PCSs 100 is set to "N," a matrix of N.times.3 may be used to express the weights for each weight decision element computed for each PCS 100. In addition, the relative weights for each weight decision element may be expressed in a matrix of 3.times.1. If the two matrices are multiplied, a weight matrix of N.times.1 can be obtained.

Figure 9:
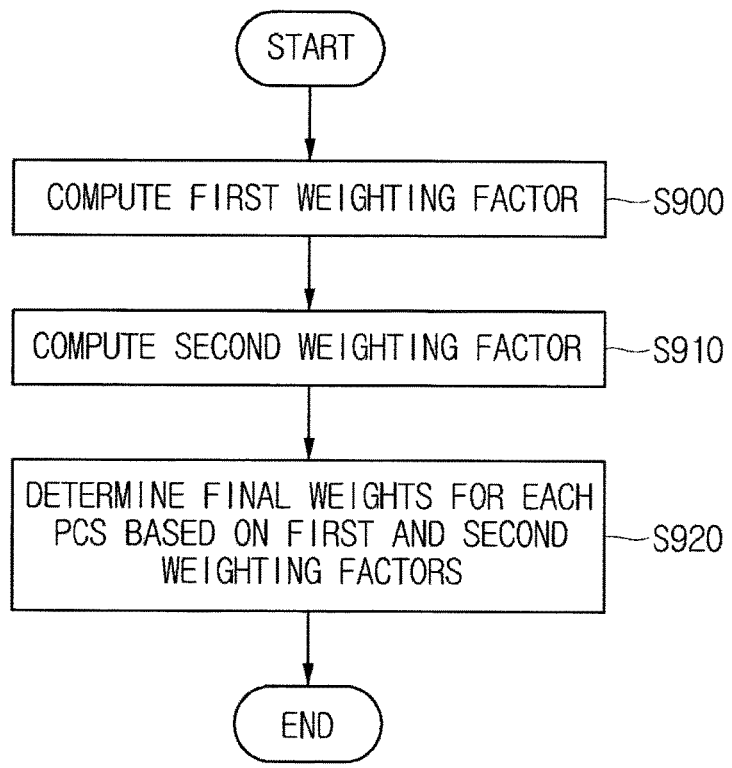
FIG. 9 is a conceptual diagram illustrating a method of determining electric power supplied to a power conditioning system (PCS) according to an embodiment of the invention.

FIG. 9 is a flowchart illustrating a method of determining electric power supplied to the PCS 100 according to an embodiment of the invention.

In FIG. 9, the weights for each PCS 100 are determined to supply the total electric power to each PCS 100.

Referring to FIG. 9, a first weighting factor is computed (step S900).

The first weighting factor may include relative weights for each weight decision element. Various weight decision elements may be employed to determine which PCS 100 is supplied with more electric power. For example, if the charge capacity, the SoC, and the discharge efficiency are employed as the weight decision elements, the relative weights for each weight decision element may be determined as the first weighting factor.

A second weighting factor is computed (step S910).

The second weighting factor may include the weights computed for each PCS in regard to each weight decision element. For example, in regard to the first weight decision element (charge capacity), whether or not the weight higher than that of the second PCS is given to the first PCS may be determined. In this manner, the second weighting factor may be computed for each PCS 100 in regard to each weight decision element.

Final weights for each PCS 100 are determined on the basis of the first and second weighting factors (step S920).

The final weights for each PCS may be determined in consideration of both the first and second weighting factors. The determined final weights may be used to distribute a total power amount to the PCSs.

Figure 10:
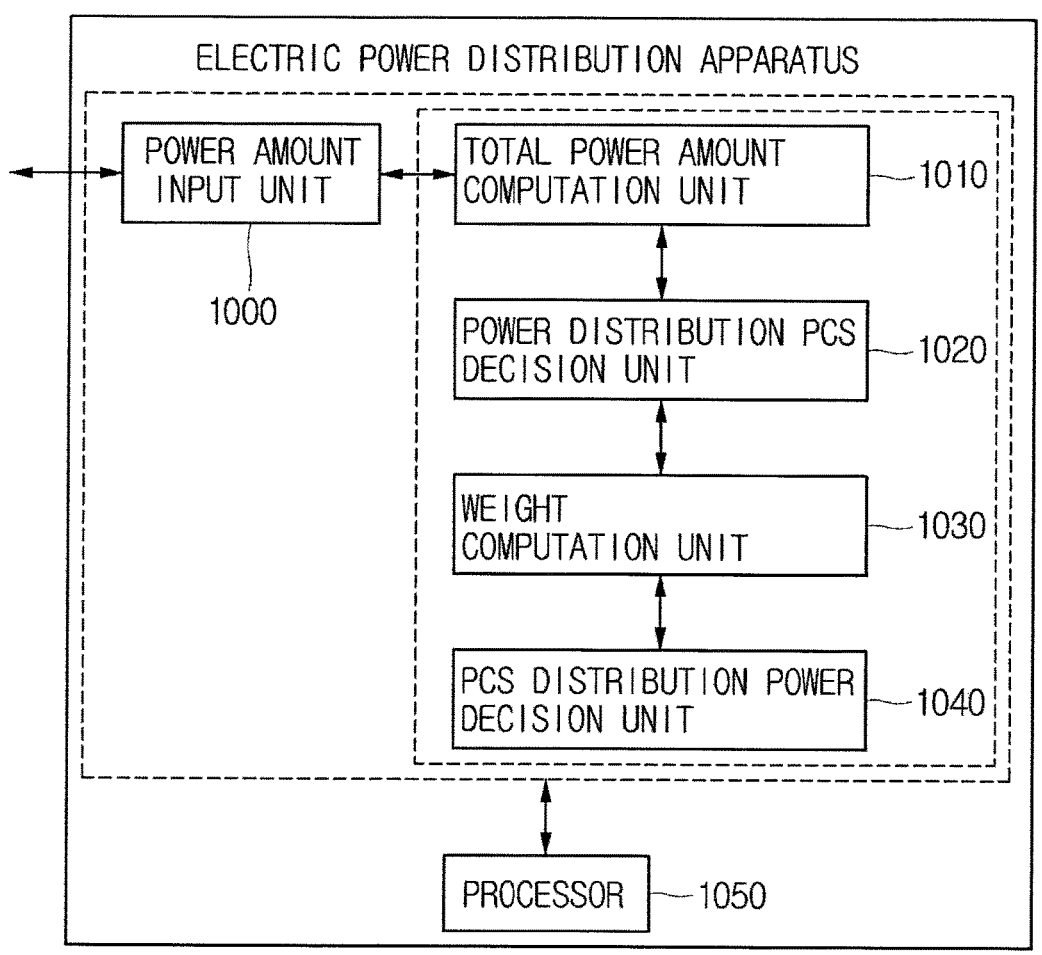
FIG. 10 is a conceptual diagram illustrating an apparatus for distributing electric power according to an embodiment of the invention.

FIG. 10 is a conceptual diagram illustrating an electric power distribution apparatus according to an embodiment of the invention.

Referring to FIG. 10, the electric power distribution apparatus may include a power amount input unit 1000, a total power amount computation unit 1010, a power distribution PCS decision unit 1020, a weight computation unit 1030, a PCS distribution power decision unit 1040, and a processor 1050.

The power amount input unit 1000 may receive information on a new user output target power amount. The power amount input unit 1000 may receive information on the new user output target power amount to perform power distribution to each PCS 100.

The total power amount computation unit 1010 may be implemented to compute the total power amount on the basis of the new user output target power amount received by the power amount input unit 1000 and the deviation amount received additionally. The deviation amount may be computed on the basis of information on a difference between the existing user output target power amount and the total power amount stored in the ESS. The total power amount computation unit 1010 may compute the current total power amount of the ESS in consideration of the deviation amount as information on a difference between the existing total power amount and the existing user output target power amount and the new user output target power amount received newly.

The power distribution PCS decision unit 1020 may detect the SoCs of the PCSs 100 included in the ESS and determine the PCS to which the electric power is distributed. For example, the power distribution PCS decision unit 1020 may detect the SoC of each PCSs 100 and perform charging only for the PCS having a chargeable state. For example, the power distribution may not be performed for the PCS 100 having a predetermined SoC range (for example, 90 to 100%). In this case, the corresponding PCS may be excluded from a power distribution PCS target group.

The weight computation unit 1030 may be implemented to compute the weights for distributing electric power to each PCS. The weight computation unit 1030 may determine final weights for each PCS on the basis of the weights for each weight decision element computed for each PCS and the relative weights for each weight decision element as described above.

The PCS distribution power decision unit 1040 may be implemented to determine electric power supplied to each PCS on the basis of final weights for each PCS computed by the weight computation unit 1030.

Electric power may be distributed to each PCS depending on the determination of the power distribution PCS decision unit 1040.

The processor may control operations for the power amount input unit 1000, the total power amount computation unit 1010, the power distribution PCS decision unit 1020, the weight computation unit 1030, and the PCS distribution power decision unit 1040.

Although exemplary embodiments of the present invention have been shown and described hereinbefore, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

The invention claimed is:

1. An electric power distribution method in an energy storage system (ESS), comprising:
   computing a total power amount on a basis of a received user output target power amount and a deviation amount;
   determining a power distribution power conditioning system (PCS), to which the total power amount is distributed, out of power distribution PCSs included in the ESS;
   distributing the total power amount on a basis of a weight for the power distribution PCS,
   wherein the deviation amount is a difference between an existing total power amount and an existing user output target power amount used in the ESS,
   wherein the power distribution PCS is determined by detecting a state of charge (SoC) of a battery under control of the power distribution PCS,
   wherein the weight for the power distribution PCS is determined based on a first and a second weighting factors,
   wherein the first weighting factor is a relative weight for a weight decision element including a charge capacity, a charge efficiency and a discharge efficiency,
   wherein the second weighting factor is a normal weight for each weight decision element computed for each power distribution PCS, and
   wherein an analytic hierarchy process (AHP) is employed to compute the weight.

2. The electric power distribution method according to claim 1, further comprising storing the user output target power amount and the deviation amount.

3. An electric power distribution apparatus that performs power distribution, the electric power distribution apparatus comprising a processor, the processor being implemented to compute a total power amount on a basis of a received user output target power amount and a deviation amount, determine a power distribution power conditioning system (PCS), to which the total power amount is distributed out of power distribution PCSs included in an energy storage system (ESS), and distribute the total power amount on a basis of a weight for the power distribution PCS,
   wherein the deviation amount is a difference between an existing total power amount and an existing user output target power amount used in the ESS,
   wherein the power distribution PCS is determined by detecting a state of charge (SoC) of a battery under control of the power distribution PCS,
   wherein the weight for the power distribution PCS is determined based on a first and a second weighting factors,
   wherein the first weighting factor is a relative weight for a weight decision element including a charge capacity, a charge efficiency and a discharge efficiency,
   wherein the second weighting factor is a normal weight for each weight decision element computed for each power distribution PCS, and
   wherein an analytic hierarchy process (AHP) is employed to compute the weight.

4. The electric power distribution apparatus according to claim 3, wherein the processor is implemented to store the user output target power amount and the deviation amount.

\* \* \* \* \*